United States Patent [19]

Marshall et al.

[11] Patent Number: 4,678,673

[45] Date of Patent: Jul. 7, 1987

[54] FERMENTED OILSEED PRODUCT FOR PREPARING IMITATION DAIRY PRODUCTS

[75] Inventors: Wayne E. Marshall, Spring Grove; Constance J. Hofmann, Arlington Heights, both of Ill.

[73] Assignee: Kraft, Inc., Glenview, Ill.

[21] Appl. No.: 587,982

[22] Filed: Mar. 9, 1984

[51] Int. Cl.$^4$ .................. A23L 1/20; A23C 11/06; A23C 20/00

[52] U.S. Cl. ........................ 426/46; 426/36; 426/44; 426/582

[58] Field of Search ............ 426/33, 36, 39, 44, 426/46, 52, 582, 656

[56] References Cited

U.S. PATENT DOCUMENTS 3,891,777  6/1975  Boyer .............................. 426/656 X
3,982,025  9/1976  Hashimoto et al. ................ 426/46
4,172,900  10/1979  Dooley ............................ 426/38
4,315,946  2/1982  Greiner et al. .................. 426/46
4,390,560  6/1983  Koide et al. .................... 426/36 X

OTHER PUBLICATIONS

Dranen, et al., Applied Microbiology, vol. 22, No. 4, 1971, pp. 517–521.

*Primary Examiner*—David M. Naff
*Attorney, Agent, or Firm*—Fitch, Even, Tabin & Flannery

[57] ABSTRACT

Oilseed products are fermented with a microorganism which produces diacetyl and acetylmethylcarbinol. The microorganism is preferably *Lactobacillus caseissprhamnosus* ATCC 39595. The fermented oilseed products have a buttery or dairy-like flavor and are useful in preparing imitation dairy products such as imitation cream cheese.

8 Claims, 4 Drawing Figures

FERMENTED OILSEED PRODUCT FOR PREPARING IMITATION DAIRY PRODUCTS

BACKGROUND OF THE INVENTION

The present invention is directed to processes for preparing bland oilseed products, and more particularly, to such processes for preparing edible oilseed products utilizing fermentation techniques which impart buttery or dairy-like flavors to the oilseed product. The present invention is also directed to dairy like products such as imitation cream cheese products derived from oilseed components as milk or caseinate replacers.

Substantial technical effort has been directed to the utilization of oilseed products, particularly including soybean products which are perceived as beany, grassy and cereal-like in flavor with a chalky or unpleasant mouth-coating texture. Considerable attention has been directed toward improving the flavor and texture of such oilseed materials by microbial fermentation. In this regard, the production of tempeh, miso and other oriental products has utilized fermentative techniques, principally fermentation with molds. More recently, soy has been fermented with yeast [e.g., U.S. Pat. No. 3,810,997] and with bacteria [e.g., Mital and Steinkraus, J. Food Protection, 42, 895-899 (1979)] in order to improve flavor and texture. Yeast and bacteria have been used to ferment soy flour and soymilk, that is, the less refined soy products. Such microorganisms may metabolize the natural substrates found in these products, such as sugars, lipids or proteins to produce flavors which have been described inter alia as sour, astringent, soapy, bitter or brothy. The major use of bacterial fermentations has been with full-fat soy, particularly including soymilk in efforts to modify both flavor and texture of full-fat soy to convert the soymilk into soy "dairy products" like yogurt and sour cream. The principal flavor component of the fermented soymilk was lactic acid, which arose from the bacterial metabolism of sucrose, raffinose or stachyose, the three principal sugars in soymilk.

There have also been attempts to produce dairy-like flavors more associated with buttermilk and cream cheese from soy products. These flavors result from the bacterial production of two volatile compounds, namely diacetyl and acetylmethylcarbinol (AMC). Production of diacetyl and AMC in soymilk using Streptococcus species known to produce these compounds in cow's milk has been reported in soymilk after extended incubation [e.g., 48 hours, Gehrke, et al., J. Dairy Sci., 31, 213-222 (1948)]. Certain species of *Lactobacillus*, like *L. casei*, are known to be capable of diacetyl and AMC production, which has been observed in cow's milk inoculated with *L. casei*, 40 to 50 hours after inoculation [Bassette, et al., J. Dairy Sci., 50, 167-171 (1957)]. Diacetyl and AMC have been produced from *L. casei* grown in a broth medium. The addition of the metabolite pyruvate to the growth medium was reported to stimulate the production of flavor volatiles when *L. casei* was present [Branen, et al., Applied Microbiol., 22, 517-521 (1971); Benito de Cardenas, et al., Milchwissenschaft, 35, 296-300 (1980)].

However, there is a need for improved fermentation processes for manufacturing dairy-like products such as imitation cream cheese of high quality from vegetable oilseed starting materials, and it is an object of the present invention to provide such processes and products.

DESCRIPTION OF THE DRAWINGS

These and other objects of the present invention will become apparent from the following detailed description and the accompanying drawings of which.

SUMMARY OF THE INVENTION

Figure 1:
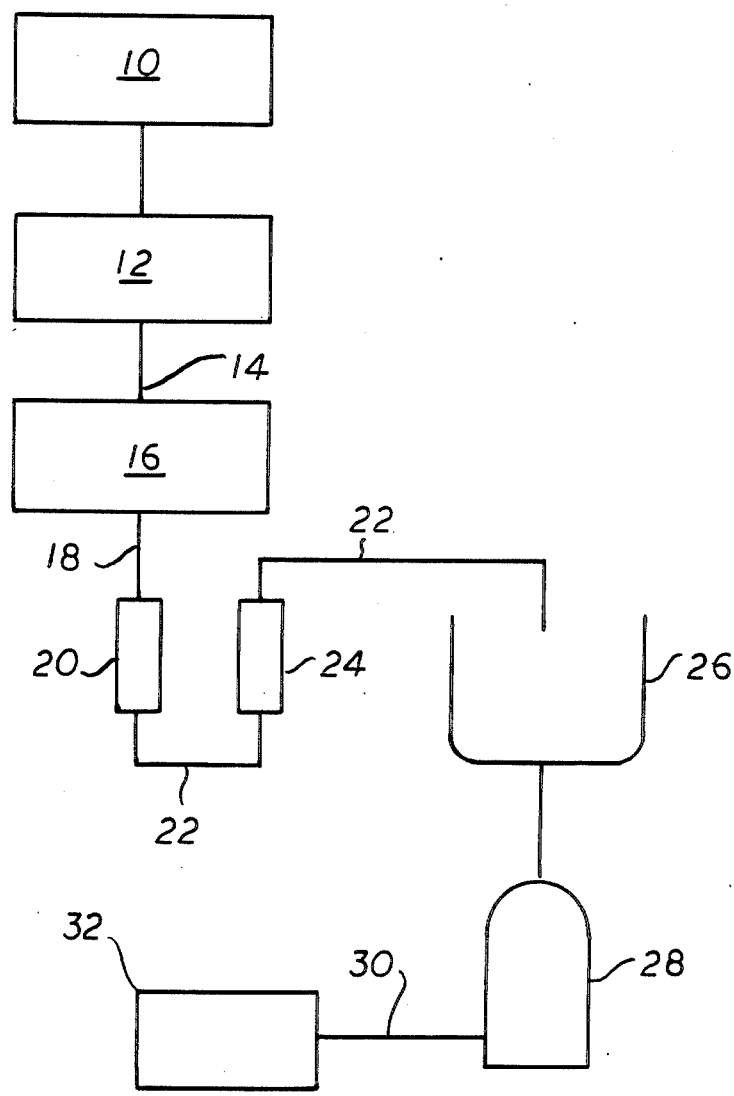
FIG. 1 is a process flow diagram of a method in accordance with the present invention.

Generally, the present invention is directed to methods for fermenting oilseed products, such as soymilk to produce fermented oilseed products having a dairy-like flavor, and to the fermented products produced thereby, including food products incorporating such fermented oilseed products. Particularly, in this regard, such fermented oilseed products also have smooth textures compatible with imitation dairy compositions such as imitation cream cheese spreads and dips.

The fermentation processes are carried out by specific microorganisms, which efficiently convert compounds present in the oilseed products to desirable, dairy-like products, particularly including Lactobacillus, *L. casei* ssp. rhamnosus which has recently been deposited by the assignee of the present invention with the American Type Culture Collection of 12301 Parklawn Dr., Rockville, Md., which has accorded the culture the identification ATCC 39595, and microorganisms which may be derived therefrom.

It is a particular advantage of the present method that the fermentation may be carried out in a relatively short period of time, such as less than 8 hours, and preferably less than 6 hours, to produce a high quality fermented product. The short fermentation times prevent the development of off-flavors which may occur under extended fermentation conditions because of heat resistant spores, microorganisms and enzymes which have undesirable effects upon extended fermentation. Moreover, the fermented product may be dried, such as by spray drying or drum drying, to produce a dried fermented oilseed product having extended shelf life and suitability for formulation into imitation dairy products.

The dairy-like flavors produced in accordance with the present methods are believed to be due principally to the presence of diacetyl and acetylmethylcarbinol, and their production can be greatly enhanced by the addition of selected fermentation enhancing components to the oilseed product before fermentation.

The fermented oilseed dried product can be used to replace milk or caseinate in imitation dairy products such as cream cheese-simulating products. Products containing the fermented oilseed material have excellent flavor and texture. In this regard, the present invention is also directed to imitation dairy products such as imitation cream cheese products comprising a homogeneous mixture of from about 3 to about 13 weight percent and preferably from about 4 to about 10 weight percent of a fermented dairylike oilseed product as disclosed herein (dry basis), from about 10 to about 40 weight percent and preferably from about 20 to about 35 weight percent of an edible fat component and from about 80 to about 40 weight percent and preferably from about 65 to about 50 weight percent of water, based on the total weight of the imitation dairy product. The edible fat component may desirably have a relatively sharp melting point in the range of from about 70° F. to about 100° F. Coconut oil is an example of a particularly preferred edible fat component having desirably melting characteristics. The imitation dairy product may further comprise additional food, flavoring and functional components such as non-fat dry milk, stabilizers, emulsifiers, melting salts, flavor agents and food grade acids. Non-fat dry milk may desirably be utilized at a level (dry basis) in the range of from about 4 to about 10 weight percent, based on the total weight of the imitation dairy product. Similarly, stabilizers such as carob bean gum, emulsifiers such as conventional imitation dairy product components including mono and diglycerides of edible fatty acids, melting salts such as sodium citrate, flavoring agents such as starter distillates and food grade acids such as lactic acid may be utilized, alone or in combination to provide desired flavor, textural or other properties. Typically, these components may, for example, be utilized at the following weight percent levels based on the total weight of the imitation dairy product:

| Component | Weight Percent |
|---|---|
| Stabilizers | 0 to 1.0 |
| Emulsifiers | 0 to 1.0 |
| Melting Salts | 0 to 1.0 |
| Flavoring Agents | 0 to 1.0 |
| Food Grade Acids | 0 to 1.0 |

Such imitation dairy products may be manufactured by blending of the components, pasteurization, homogenization and direct acidification, utilizing conventional processing equipment.

An important feature of the present invention is the relatively short fermentation times utilized to achieve the substantial benefits obtained by the fermentation. As will be described in more detail hereinafter, under certain defined conditions of pH, temperature and substrate, maximum amounts of flavor compounds can be developed in a very short time period, such as 4 to 6 hours. The addition of flavor enhancing material such as acetate and citrate stimulate flavor production. Moreover, during the course of the fermentation, the textural properties of the oilseed material are modified to provide a very smooth textured product. This modification does not appear to be provided by the usual proteolytic or lipolytic means.

As indicated, the present invention is directed to methods for fermentation of oilseed products. Such products may be selected from the oilseed group consisting of peanut, cottonseed, rapeseed, sunflowerseed and soybean, and mixtures thereof. Full-fat ground oilseed aqueous slurries such as ground soybean and soymilk slurries are the preferred starting materials. Both materials are referred to herein as full-fat soy material.

The full-fat oilseed materials such as full-fat soy material used for the fermentation is desirably prepared to be as bland as possible. For this purpose, dry, clean soybeans may be ground in the presence of hot water made alkaline with food grade alkali or alkali earth material such as sodium hydroxide or calcium hydroxide. The resulting slurry is held at a high temperature for a length of time sufficient to pasteurize the slurry, then may be neutralized with a suitable inorganic acid such as hydrochloric acid to produce a ground soybean product. If soymilk is desired, the ground soybean product may be centrifuged before neutralization to remove fiber, and then neutralized. An acceptable and more economically prepared full-fat product can also be made by grinding soybeans at neutral pH with no neutralization of the final product. In either case, the soy slurry can either be fermented after initial pasteurization or dried, stored and reconstituted to the particular solids level desired, prior to fermentation. A typical analysis of ground soybean and soymilk, in spray dried form, is given in the following Table I:

TABLE I

Proximate Analysis of Spray Dried Ground Soybean and Soymilk

| COMPONENT | GROUND SOYBEAN | SOYMILK |
|---|---|---|
| Moisture | 3.2 | 3.7 |
| Protein | 40.5 | 44.5 |
| Fat | 24.6 | 28.1 |
| Ash | 5.6 | 4.6 |
| Fiber | 4.3 | 0.5 |
| Sugars | | |
| Monosaccharides | 0.9 | 1.1 |
| Disaccharides | 5.6 | 6.7 |
| Trisaccharides | 0.9 | 1.1 |
| Tetrasaccharides | 3.5 | 4.4 |

In Table I, all values are given as percentages on a dry weight basis, except moisture, which is given as weight percentage of the spray dried product.

The solids content of the full-fat aqueous oilseed slurry utilized in the fermentation, such as a soy slurry may desirably be between 9 and 18% (w/v) without affecting flavor and texture of the final product. A higher solids content is preferred because of greater drying efficiency when it is desired to dry the fermented product after fermentation.

The oilseed slurry is given an initial pasteurization in order to minimize microbial contamination before fermentation. The pasteurization treatment is a function of both time and temperature, and may range, for example, from a moderate heat treatment at a temperature in the range of from about 150° to about 170° F. for 20 to 40 minutes or a high heat treatment at a temperature in the range of from about 200° to about 250° F. for 1 to 2 minutes, or equivalent time-temperature treatment. After pasteurization, fermentation culture is added to the slurry.

The size of the microbial inoculum should desirably be such as to achieve an initial cell density in the slurry in the range of from about $5 \times 10^5$ to about $1 \times 10^9$ cells/ml of the slurry, and preferably from about $5 \times 10^6$ to $1 \times 10^8$ cells/ml of the slurry. The cell density may be regarded to be independent of solids level in the oilseed slurry solids range of from about 9 to 18 percent, based on the total weight of the slurry. An initial cell density of about $1 \times 10^7$ cells/ml produces good product consistent with economic consideration of product manufacture, and the effectiveness of the fermentation may be enhanced by selected fermentation enhancing agents, as will be more particularly described. The culture can be added to the fermentation vessel either as a fresh concentrated cell paste harvested from a suitable broth medium (e.g., Elliker's broth) or as a concentrated paste harvested from milk medium and stored in liquid nitrogen.

As indicated, the fermentation in accordance with the present invention should be carried out at a specific fermentation pH and in this regard, the pH range for most effective fermentation should be carried out between pH 6.0 and pH 7.0 with a pH of about 6.5 being the particularly preferred value. Soy protein begins to precipitate below pH 6.0 and flavor production by the culture is decreased above pH 7.0.

The fermentation should also be carried out at a specific temperature, and in this regard, the fermentation temperature should be in the range of from about 75° F. to about 90° F., with a fermentation temperature in the range of 80°-90° F. being particularly preferred.

The fermentation time is also an important feature of the methods. In this regard, the fermentation should be carried out in less than 8 hours, and preferably less than 6 hours (e.g., from 3-6 hours). After 8 hours, or even after 6 hours, contaminant levels in the slurry may become significant, thus, adversely affecting final product flavor and texture.

After fermentation, the fermented product is pasteurized to inactivate the culture. As with the initial pasteurization, either moderate or high heat treatments can be used. In this regard, after final pasteurization, the fermented slurry can either be stored as a slurry or dried. If it is not desired to dry the fermented product, the slurry should best be stored at low temperature 30°-40° F. with usable storage life of about 1 week without further processing to inactivate spores which may be naturally present in the oilseed starting material. The fermented product can be dried in any suitable manner, such as by drum, spray or freeze drying and can be stored in its dried condition at room temperature for an extended period, e.g., about 6 months.

An embodiment of a fermentation method in accordance with the present invention for producing fermented ground soybean and the use of such product in a food system, is shown in FIG. 1.

As shown in FIG. 1, dry, clean, whole soybeans 10 are fed into a grinding mill 12 such as a Jabez-Burns mill at the ratio of 1 pound of soybeans to 9 pounds of hot water having a temperature of 187° F. The ground soybean slurry 14 produced thereby is adjusted to pH 8.6 with calcium hydroxide, and is finely ground to a suspension by a suitable grinding apparatus 16 such as an Urschel Comitrol grinder equipped with a 216T grinding head. The finely ground suspension 18 is held at 187° F. for 1 or 2 minutes in a holding tube 20 to pasteurize the suspension. The pasteurized, ground, soybean suspension 22 is cooled to 90° F. through a heat exchanger 24 and transferred to a fermentation vessel 26. Sufficient sodium acetate is added to make the soy suspension 22, 0.3% (w/w) in sodium acetate, based on 10 weight percent (w/w) solids. A sufficient amount of L. casei culture (ATCC 39595) is added to the fermentation vessel 26 to produce a cell density of $1 \times 10^7$ cells/ml. The fermentation is carried out at pH 6.5, at a temperature of 90° F. for four hours duration. After four hours, the fermented soy is pasteurized at 250° F. for 20 seconds and spray dried in a spray dryer 28 at a temperature of 280° F. The final spray dried product 30 is dried to a level of 96% total solids.

The spray dried, fermented soy product 30 is incorporated into an imitation cream cheese spread 32 at a level of 4.2% (w/w) of the total product. The spread consists of 60.5% water, 25% fat (coconut oil), 8.8% non-fat dry milk, and 1.5% stabilizers, emulsifiers, flavor enhancers and salts in addition to the fermented soy.

The fermented, ground soybean material imparts buttery, dairy like flavors to an otherwise bland base while retaining the creamy texture of the product. The soy-based product provides a suitable base for the addition of a wide range of flavoring agents and additional food components, including onion, pimento and raspberry.

As indicated, specific Lactobacilli are used in fermentations in accordance with the present methods. Such a fermentation microorganism should produce buttery, dairy-like flavors in oilseed products. In order to select such a microorganism, several different subspecies of Lactobacillus casei were screened in a test imitation cheese system. One particular organism, L. casei ssp. rhamnosus (ATCC 39595) performed much better in the test imitation cheese system than the others. After the initial screening, this particular L. casei was evaluated in the manufacture of an imitation cream cheese spread as described hereinafter, together with several different species of Lactobacillus. These lactobacilli were tested in a cream cheese spread product after fermentation of full-fat soy.

The imitation cream cheese test system had the following composition and was prepared in the following manner. Fermented full-fat soy, 4.2%; non-fat dry milk, 8.8%; coconut oil (92° melt), 6.1%; coconut oil (76° melt), 18.4%; sodium chloride, 0.3%; sodium citrate, 0.1%; carob gum, 0.3%; citric acid, 0.2%; Atmos 150 (a mono- and diglyceride emulsifier), 0.3%; calcium chloride, 0.1%; lactic acid, 0.4%; Alex Fries starter distillate (a flavoring agent), 0.04%; water, 60.5%. The coconut oil was heated to 135° F. and the fermented full-fat soy added to it. The soy-oil blend was then set aside temporarily. Water was heated to 110° F. and non-fat dry milk, sodium chloride, carob gum, Atmos 150 emulsifier, and sodium citrate were all dispersed in the water. The aqueous dispersion was heated to 135° F. and the soy-oil blend added to it. The entire mixture was heated to 180° F. and calcium chloride, citric acid, lactic acid and starter distillate were added. The product mixture was standardized to 39.2% total solids and homogenized in two stages. First stage homogenization was at 2100 psi and the second stage homogenization was at 500 psi. The final product was then poured into containers and cooled. The degree-of-liking of the spread was monitored and the results are presented in Table II, as follows:

TABLE II

Screening of Different Lactobacilli in an Imitation Cream Cheese Test System

| Organism | Degree-of-Liking in Test System |
|---|---|
| L. casei ssp. rhamnosus (ATCC No. 39595) | Excellent |
| L. buchneri | Good |
| L. brevis | Good |
| L. cellobiosis | Fair–Good |
| L. plantarum | Poor |
| L. fermentum | Poor |
| L. salivarius | Poor |
| L. acidophilus | Poor |

Ground soybean was fermented with each of the above lactobacilli at 90° F., pH 6.5 for 4 hours. The fermented, ground soybean was incorporated into an imitation cream cheese test system and evaluated by a twelve member taste panel. The degree-of-liking scale was Poor–Excellent. The inoculum level for the fermentations was approximately $1 \times 10^8$ cells/ml.

The spread which contained the full-fat soy fermented with *L. casei* was rated highest in degree-of-liking. The product had buttery, dairy-like flavor with some tartness present. The other products, especially those with a poor degree-of-liking, were very sour and astringent in flavor.

Figure 2:
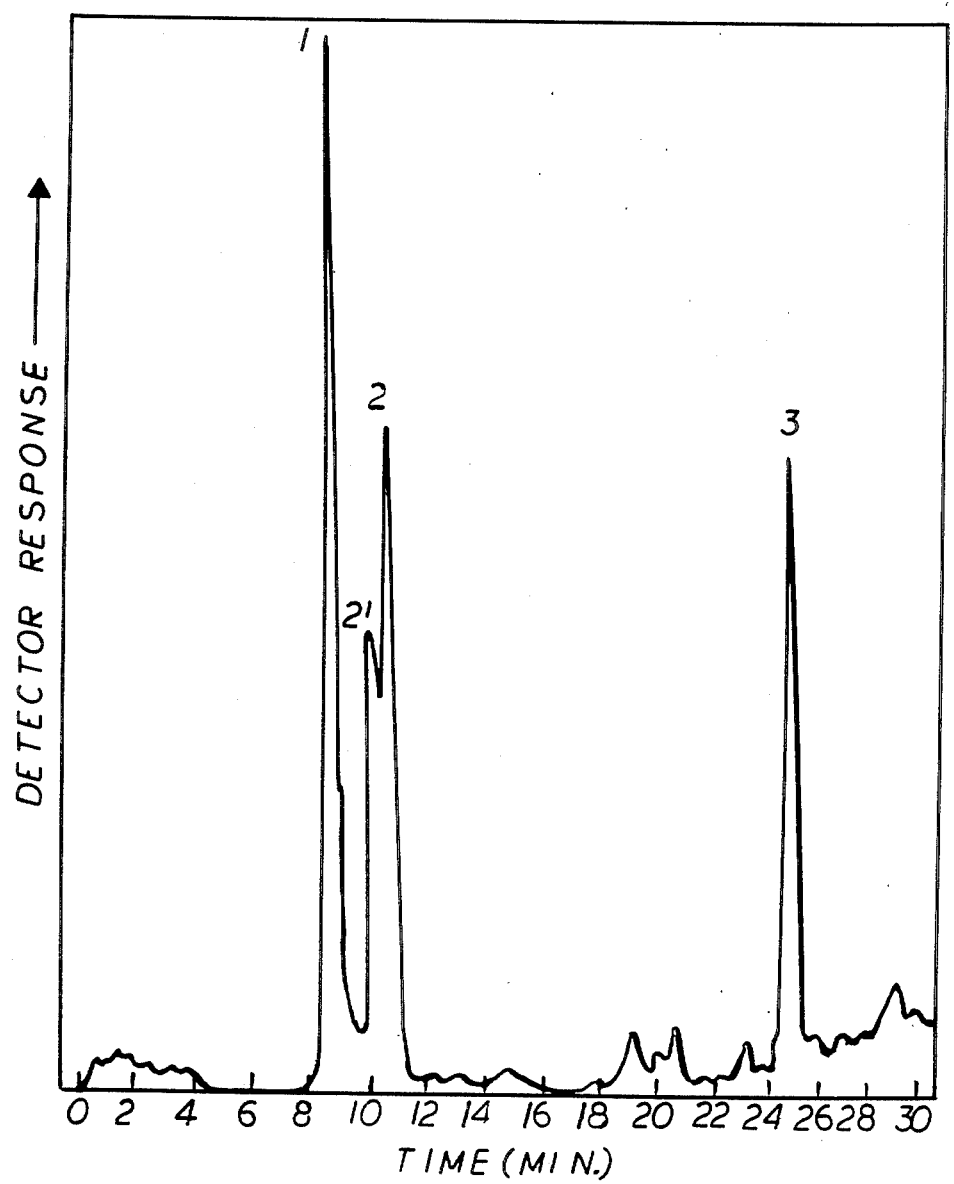
FIG. 2 is a gas chromatographic elution profile of spray dried ground soybean.
Figure 3:
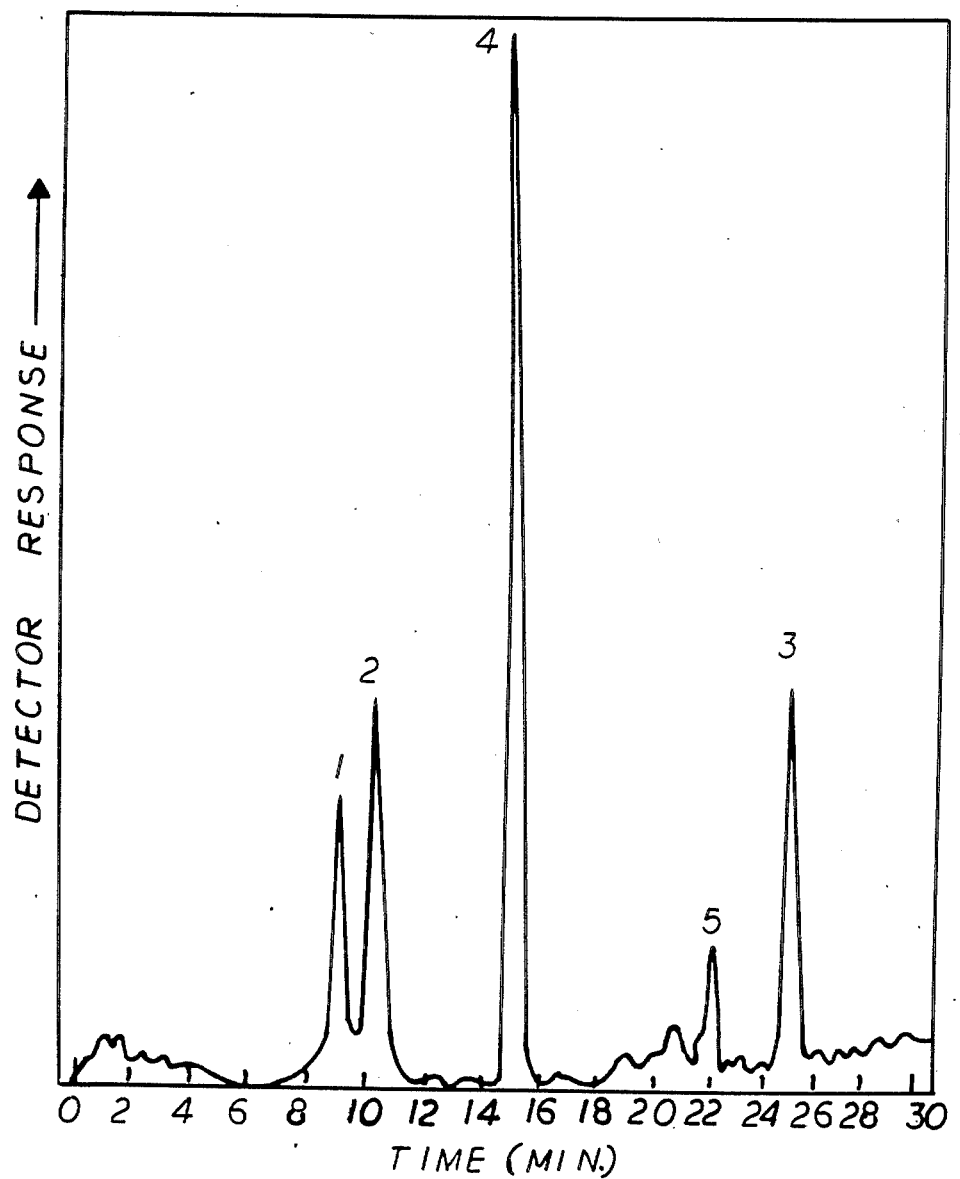
FIG. 3 is a gas chromatographic elution profile of an embodiment of fermented spray dried ground soybean in accordance with the present invention.

To determine the compounds responsible for the highly desirable flavor profile present in the fermented product, samples of fermented and non-fermented full-fat soy powder were subjected to neutral volatile analysis by gas chromatography and mass spectroscopy techniques. In this regard, the non-fermented and fermented ground soybean suspensions, respectively were spray dried. Three tenths of one gram of the (non fermented) spray dried ground soybean material was slurried in 0.3 ml. of water and the neutral volatiles were purged onto an absorption column at 80° C. and subjected to gas chromatographic separation, with output elution profile as shown in FIG. 2. Marker elution peaks numbered 1, 2, 2' and 3 were identified by mass spectroscopy as acetone (1), pentane (2), pentanal (2') and hexanal (3), respectively. Similarly, 0.3 grams of the spray dried, fermented soybean material which had been fermented with *L. casei* (ATCC 39595) at a temperature of 90° F., at an inoculum level of $1 \times 10^8$ cells/ml at a pH of 6.5 for 4 hours, was slurried with 0.3 ml. of water and the neutral volatiles were purged onto an absorption column at 80° C. and subjected to gas chromatographic separation with output elution profile as shown in FIG. 3. Elution peaks 1, 2, 3, 4 and 5 as shown in FIG. 3 were identified respectively as acetone (1), pentane (2), hexanal (3), diacetyl (4) and acetylmethylcarbinol (5). The only substantial difference in gas chromatographic profiles may be seen to be two peaks labeled 4 and 5 in FIG. 3. These peaks were identified by mass spectroscopy as diacetyl (peak 4) and acetylmethylcarbinol (peak 5). Both compounds are known producers of buttery, dairy-like flavors in milk products.

In order to determine whether the specific *L. casei* fermentation may be producing other compounds that could contribute to the overall, unique, fermented flavor profile such as short-chain fatty acids ($C_2$ to $C_{10}$ fraction) from lipolysis of the soybean oil, peptides or amino acids from protein hydrolysis, and lactic acid from carbohydrate utilization, full-fat soy was fermented with different inoculum levels of *L. casei* (ATCC 39595). The results are given in Table III, as follows:

6.5, 90° F. for 4 hours. All samples were then spray-dried and the metabolite concentrations determined on the spray dried powders (96% total solids). The $C_3$-$C_{10}$ free fatty acid concentrations were measured on all samples and values were found to be below the delectable limit (20 μg/g sample) of the chromatographic assay.

As may be seen from the data of Table III, the concentrations of diacetyl and acetylmethylcarbinol increased with increased cell density. It should be noted that acetic acid ($C_2$ fatty acid) present in the starting material decreases in concentration at lower cell densities but rose above the original level at higher cell densities. A small pH decrease of about 0.2 pH units may also indicate a small amount of lactic acid production during the fermentation. The amino nitrogen results were unchanged and there was no indication of free fatty acids other than acetic acid present in the fermentate. The viable cell count showed little change during the 4 hour fermentation as usually only a two-fold increase was observed. Accordingly, it appears that the *L. casei* fermentations as previously described may be carried out under conditions which are neither proteolytic nor lipolytic in a full-fat soy medium, which produce a small amount of lactic acid, and which may produce acetic acid at high cell densities. The organism appears to be using an alternate pathway for flavor volatile production rather than the usual glycolytic pathway (sugar—lactic acid). Therefore, the principal flavor producing compounds appear to be diacetyl, acetic acid (at high cell densities) and possibly lactic acid. Acetylmethylcarbinol is probably present at too low a concentration to contribute significantly to the flavor profile.

Since a small amount of lactic acid was detected in the dried, fermented, full-fat soy, saccharolytic activity of the culture was monitored by comparing the amounts of sucrose, raffinose, stachyose and glucose (soy has no lactose) present in fermented soy to a non-fermented control (data not shown). No substantial changes in the amounts of any of these sugars was observed, even at cell densities approaching $1 \times 10^9$ cells per ml sample. It must be noted that glucose is not a "common" sugar in soy, with a concentration of 0.6 milligram per gram of sample, but one which should be easily metabolized. Therefore, the lactic acid observed may not be derived from soy sugar breakdown, but possibly from endogenous substrate utilization by the cells, after transfer to the soy medium.

TABLE III

Metabolite Content of Ground Soybean Arising from its Fermentation with Different Inoculum Levels of *L. casei*

| Sample Desig. | *L. casei* VIABLE CT (cells/ml) | DIACETYL (μg/g) | METABOLITE | | | |
|---|---|---|---|---|---|---|
| | | | AMC (μg/g) | ACETIC ACID (mg/g) | LACTIC ACID (mg/g) | AMINO NITRO. (mg/g) |
| Ground Soybean (Cntrl) | 0 | 0 | 0 | 1.9 | 0.2 | 4.6 |
| 1 FCP | $7 \times 10^6$ | 4.3 | 0.3 | 1.0 | 2.0 | 4.3 |
| 10 FCP | $5 \times 10^7$ | 14.2 | 1.0 | 1.7 | 1.2 | 4.3 |
| 20 FCP | $9 \times 10^7$ | 21.4 | 2.4 | 2.4 | 1.5 | 4.5 |
| 100 FCP | $7 \times 10^8$ | 28.7 | 7.3 | 5.1 | 2.3 | 4.7 |

The designation "FCP" with prefacing number refers to the amount (in milliliters of Frozen Cell Paste) added to the ground soybean suspension before fermentation. The *L. casei* viable count is an initial cell count taken at time t=0 minutes. Ground soybean suspensions (10% solids) were fermented at the various inoculum levels except the Control. All samples were processed at pH In order to quantitate differences in both flavor and texture between fermented and non-fermented full-fat soy products, an imitation cream cheese spread test composition was utilized. The test composition consists of 60.5% water, 25% coconut oil (fat), 4.2% full-fat soy, 8.8% non-fat dry milk and 1.5% stabilizers, flavor enhancers, emulsifiers and salts. The test system is sufficiently bland in flavor and creamy in texture that the effect of additives like soy on flavor and texture will be readily apparent. Both fermented soymilk and fermented ground soybean were compared to their respective non-fermented controls in the imitation cream cheese spread. The products were evaluated in a thirty member, sensory evaluation panel and the results given in Tables IV and V, as follows:

TABLE IV

Sensory Evaluation of Imitation Cream Cheese Spread with Fermented and Non-Fermented Soymilk

|  | Fermented Soy Milk | Non-Fermented Soy Milk | Significant Difference in Mean Scores |
| --- | --- | --- | --- |
| Overall Appearance | 6.5 | 6.1 | NSD |
| Overall Texture | 5.8 | 5.2 | .05 |
| Overall Flavor | 4.7 | 3.5 | .01 |
| Overall Opinion | 4.7 | 3.5 | .01 |
| Color | 3.9 | 4.4 | .10 |
| Body | 5.4 | 6.1 | .05 |
| Smoothness | 7.1 | 6.4 | .01 |
| Creaminess | 6.2 | 5.2 | .05 |
| Greasiness | 4.8 | 4.9 | NSD |
| Cream Cheese Flavor | 4.3 | 3.4 | .05 |

TABLE V

Sensory Evaluation of Imitation Cream Cheese Spread with Fermented and Non-Fermented Ground Soybean

|  | Fermented Ground Soybean | Non-Fermented Ground Soybean | Significant Difference in Mean Scores |
| --- | --- | --- | --- |
| Overall Appearance | 6.3 | 6.5 | NSD |
| Overall Texture | 5.4 | 4.6 | .05 |
| Overall Flavor | 4.3 | 3.3 | .01 |
| Overall Opinion | 4.2 | 3.3 | .01 |
| Color | 4.1 | 4.1 | NSD |
| Body | 4.9 | 4.4 | .10 |
| Smoothness | 6.2 | 6.2 | NSD |
| Greasiness | 4.2 | 4.4 | NSD |
| Slickness | 5.2 | 5.6 | NSD |
| Cream Cheese Flavor | 4.1 | 3.4 | .05 |

In the categories which describe overall performance (appearance, texture, flavor, opinion) and cream cheese flavor, the fermented products were significantly preferred. Tables IV and V use the Hedonic Rating Scale of 1 to 9 where 1 is least and 9 is most of a particular attribute.

Figure 4:
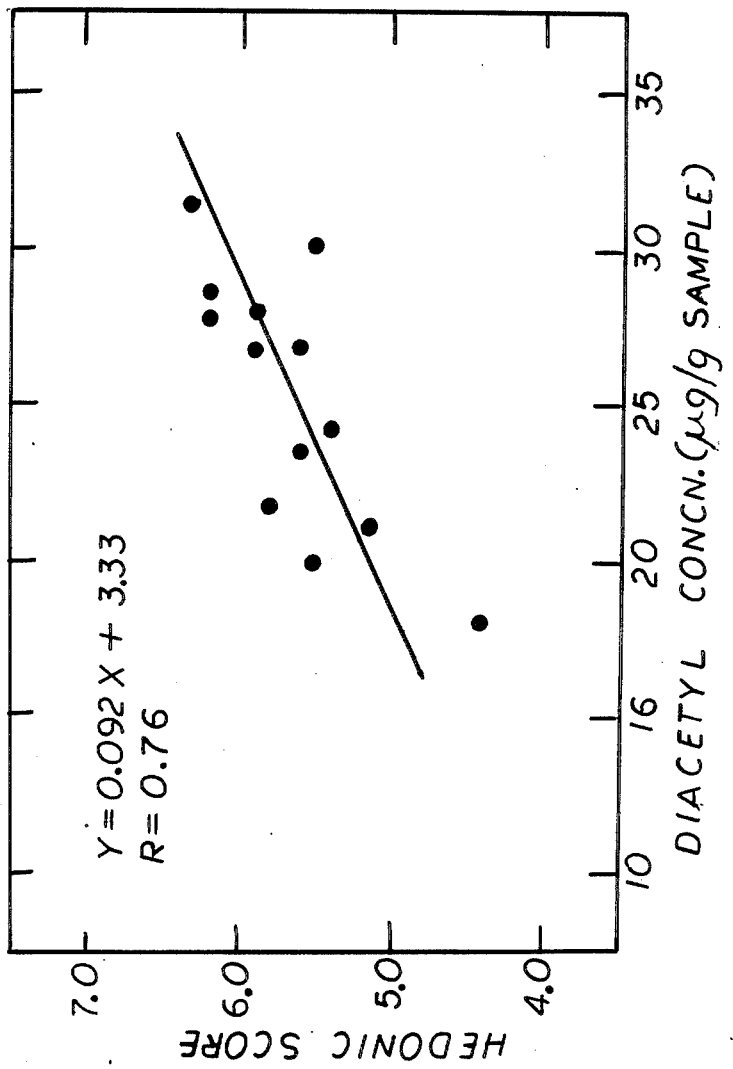
FIG. 4 is a graph of Hedonic score of flavor preference in imitation cream cheese spread versus diacetyl content of various fermented ground soybean products.

The cream cheese test system was utilized in optimization of fermentation conditions of pH, temperature and fermentation time. In this regard, products with a high degree-of-liking had high diacetyl levels in the full-fat soy and vice-versa. A plot of the actual values given for both parameters from several different taste panels is given in FIG. 4, indicating a direct correlation between degree of liking and diacetyl concentration levels. In FIG. 4, Hedonic Score refers to a hedonic rating scale of perceived cream cheese flavor intensity where 1=weak, 5=moderate, and 9=strong. Therefore, the diacetyl concentration in the soy product is a major contributor to the degree-of-liking of the cream cheese spread.

Since product acceptance is related to diacetyl concentration, it would be desirable to investigate methods of increasing the diacetyl level in the fermented soy. As stated before, increasing cell number will increase diacetyl and AMC values (Table III), but fermentations with high ($1 \times 10^8$ cells/ml) cell densities are expensive with high add-on cost to the dried, fermented product. Therefore, additives are needed that will stimulate flavor volatile production in $L.$ $casei$ so lower levels (e.g., $10^7$ cells/ml) of culture can be used to produce an acceptable product.

Branen, et al. and Benito deCardenas, et al., supra, report considerable flavor volatile production from $L.$ $casei$ in the presence of pyruvate and slight increases in flavor volatiles in the presence of citrate and acetate. These results can be reconciled in light of the proposed pathway for flavor production in $St.$ $lactis$ ssp. diacetylactis [Kempler, et al., J. Dairy Sci., 64, 1527–1539 (1981)]. Assuming a similar pathway in $L.$ $casei$, pyruvate, acetate and citrate are all potential precursors of diacetyl and AMC.

In an attempt to stimulate flavor production, full-fat soy was fermented with $L.$ $casei$ (ATCC 39595) in the presence of pyruvate, acetate or citrate. A fermentation was carried out in the presence of glucose also, in order to determine the effect of active glycolysis on diacetyl and AMC production. The results are presented in Table VI, as follows:

TABLE VI

Diacetyl and AMC Content of Ground Soybean Fermented in the Presence of Different Additives

| ADDITIVE | DIACETYL ($\mu$g/g sample) | AMC ($\mu$g/g sample) |
| --- | --- | --- |
| None | 30.1 | 2.6 |
| 0.15% Sodium Acetate | 44.0 | 3.2 |
| 0.15% Sodium Citrate | 42.7 | 4.0 |
| 0.15% Sodium Pyruvate | 18.2 | 2.0 |
| 1.0% Glucose | 17.0 | 2.3 |

In Table VI, the concentrations of additives are given as a weight percentage of additives per weight of a 10 weight percent aqueous suspension.

Ground soybean as a 10% (w/w) suspension was fermented with or without additives for 4 hours at 90° F., pH 6.5. The initial $L.$ $casei$ concentration was $1 \times 10^8$ cells/ml. The diacetyl and AMC concentrations were determined on the fermented, spray dried powder.

In the presence of added pyruvate, there was a 40% decrease in diacetyl with a decrease in AMC as well. Pyruvate may not be effective in the present case because active glycolysis (presence of glucose) may be necessary for pyruvate to stimulate diacetyl and AMC production [Hegazi and Abo-Elnaga, Z. Lebensm. Unters. Forsch., 171, 367–370 (1981)]. Both added acetate and citrate did stimulate diacetyl and AMC production in $L.$ $casei$ (ATCC 39595) to the extent of 46 and 42%, respectively for diacetyl. The reaction of the culture system to added glucose was similar to that for pyruvate in terms of flavor volatile production. In the presence of acetate or citrate, a slight increase in cell growth was noted compared to a fermentation where no additive was used. Lactic acid production was not affected, and the pH change was similar. No proteolytic, lipolytic or saccharolytic activity was observed. With pyruvate as an additive, a slight increase in cell growth was seen, but lactic acid levels increased and the pH decreased compared to a fermentation where no additive was used. The presence of glucose stimulated cell growth and lactic acid production well above the levels of the other additives and the control. No proteolytic or lipolytic activity was seen with either pyruvate or glucose. These results are consistent with the existence of two separate metabolic pathways in *L. casei* ssp. rhamnosus (ATCC 39595). With glucose as an additive, glycolysis occurred, cell growth was stimulated, and the metabolic product pyruvate was converted to lactic acid rather than diacetyl and AMC. With acetate or citrate as additives, a secondary pathway, leading to diacetyl production, was stimulated with no overall benefit to the cell in terms of adenosine triphosphate production and cell growth (see Kempler, et al., supra).

The dried, full-fat soy products fermented in the presence of different additives were evaluated in the described cream cheese test system. Degree-of-liking was consistent with the diacetyl content of the soy given in Table VI, supra. Soy with acetate was slightly preferred to soy with citrate, followed by soy with no additives. Soy with pyruvate or glucose was least preferred.

The use of 0.15% sodium acetate or 0.15% sodium citrate as previously described, produced a fermented soy in which the degree-of-liking was higher than a fermented soy with no additives. Because the acetate sample was slightly preferred to the citrate sample in degree-of-liking and because acetate is a less expensive additive at equal concentrations, further experiments were carried out to optimize the quantity of sodium acetate added for maximum flavor production. Through such studies, an acceptable range of acetate values was found to be in the range of from about 0.15 to about 0.60 weight percent, based on the weight of additives per weight of aqueous fermentation suspension. The optimum acetate level was found to be 0.30 weight percent. Quantities of sodium acetate greater than about 0.60 weight percent impart off-flavors to the imitation cream cheese spread. The addition of sodium acetate provides for a reduction in the culture density of from $1 \times 10^8$ cells/ml to a cell concentration level which may be in the range of, for example, from about $5 \times 10^6$ to about $1 \times 10^7$ cells/ml, a 10 to 20 fold decrease, to produce the same degree-of-liking in the product.

A comparison of *L. casei* fermentations to standard cream cheese cultures which are known to produce flavor and texture similar to those produced by *L. casei* was carried out to study the flavor volatile production in full-fat soy material using two standard cream cheese cultures, FR1 (Miles) and #302 (Kraft). The three cultures were compared in the presence and absence of added compounds (acetate or glucose plus citrate) known to enhance flavor volatile formation. The results are presented in Table VII, as follows:

TABLE VII

A Comparison of Diacetyl and AMC Concentrations Between Ground Soybean Fermented with *L. casei* and Ground Soybean Fermented with Two Different Cream Cheese Cultures

| CULTURE | ADDITIVES | DIACETYL ($\mu$g/g sample) | AMC ($\mu$g/g sample) |
|---|---|---|---|
| *L. casei* (ATCC 39595) | None | 4.6 | 0.25 |
| FR1 | None | 2.0 | 1.3 |
| 302 | None | 1.0 | 0.1 |
| *L. casei* (ATCC 39595) | 0.30% Sodium Acetate | 11.4 | 0.56 |
| FR1 | 1.0% Glucose 0.10% Sodium Citrate | 1.2 | 1.1 |
| 302 | 1.0% Glucose 0.10% Sodium Citrate | 1.0 | 0.1 |

The FR1 culture is a standard cream cheese culture obtained from Miles Laboratories, Elkart, IN and consists of a mixed culture of *St. Lactis* and *Leuconostoc cremoris*. Culture 302 is a standard cream cheese culture and consists of a mixed culture of *St. lactis* and *Leuconostoc lactis*. All three cultures utilized in the work reported in Table VII were compared at a cell density of $5-10 \times 10^6$ cells/ml. The FR1 and 302 cultures were incubated in the presence of ground soybean suspension (10% solids) at 72° F. (their optimum fermentation temperature) at an initial fermentation pH of 6.5, for 4 hrs, in the presence or absence of additives. The *L. casei* was handled similarly except the fermentation occurred at 90° F. The additive concentrations are given per weight of suspension in a 10 weight percent aqueous suspension. The diacetyl and AMC concentrations were determined on the fermented, spray dried powders.

These results reported in Table VII clearly show more diacetyl produced from *L. casei* than the other two cultures, with or without additives. AMC content was greater in full-fat soy fermented with FR1 than with *L. casei* or #302. Culture #302 produced little if any diacetyl or AMC during the 4 hour fermentation. When the fermented products were incorporated into the imitation cream cheese base, the *L. casei* product was the preferred spread in degree-of-liking.

In this regard, ground soybean was fermented with *L. casei*, FR1, or 302 for 4 hours or 16 hours. (4 hours in the case of *L. casei*) in the presence or absence of substrate. The fermented samples were placed in product and evaluated by a taste panel of 6-8 people. Product with FR1 or 302 fermented material were compared in separate panels. The samples with the highest two hedonic scores for each culture were compared to the sample with *L. casei* fermented material. The results were are given in the following Table:

TABLE VIII

A Comparison of Flavor Acceptability and Fermentate pH Among Cream Cheese Product Containing the Different Fermentates

| Sample | Hedonic Score* | Final pH of Fermentate |
|---|---|---|
| *L. casei* (ATCC 39595) (4 hr. w/o subs) | 6.7 | 6.4 |
| FR1 (16 hr. w/o subs) | 5.7 | 5.7 |
| FR1 (16 hr. w/ subs) | 6.1 | 4.75 |
| Panel #2 | | |
| *L. casei* (ATCC 39595) (4 hr. w/o subs) | 6.7 | 6.4 |
| 302 (4 hr. w/ subs) | 6.5 | 6.2 |
| 302 (16 hr. w/ subs) | 5.5 | 4.5 |

*Average score for 6-8 panelists; subs = substrate (see Table VII)

When product which contained *L. casei* (ATCC 39595) fermented ground soybean was compared to the best products of the other fermentations, the *L. casei* product was the most preferred or at least equally preferred. No sodium acetate or sodium citrate was added to enhance flavor volatile production in the *L. casei* fermentations of Table VIII.

*L. casei* ssp. rhamnosus (ATCC 39595) accordingly appears to be particularly effective in comparison to the other lactobacilli and other cultures examined in producing relatively large quantities of flavor volatiles in full-fat soy in a relatively short fermentation time. In the absence of additives, this organism can apparently utilize the small quantities of acetate or citrate present in full-fat soy material for flavor volatile production. In the presence of acetate or citrate, volatile production is significantly increased. In both cases, the fermented material contains sufficient buttery, dairy-like flavors to be suitable for use in products requiring such flavors.

Accordingly, it will be appreciated that in accordance with the present invention, improved methods for imparting buttery or dairy-like flavors and for improving the texture of oilseed products has been provided.

In addition, it will be appreciated that highly desirable dairy-like products, such as imitation cream cheese products derived from oilseed components may be provided in accordance with the present invention. While the invention has been described with respect to certain specific embodiments, it will be appreciated that alterations, modifications and adaptations may be provided in accordance with the present invention and are intended to be within the scope of the following claims.

What is claimed is:

1. A method for producing an oilseed product containing diacetyl and acetylmethylcarbinol for use in preparing imitation dairy products, comprising the steps of grinding and combining with water an oilseed material selected from the group consisting of whole peanuts, cottonseeds, rapeseeds, sunflower seeds, soybeans and mixtures thereof, to provide a ground aqueous oilseed slurry comprising from about 9 percent to about 18 weight percent of the oilseed component, pasteurizing the aqueous slurry, inoculating the oilseed slurry with *Lactobacillus casei* ssp rhamnosus ATCC 39595 or diacetyl and acetylmethylcarbinol-producing microorganisms derived therefrom at an inoculum concentration level in the range of from about $5 \times 10^5$ to about $1 \times 10^9$ cells per milliliter of the slurry, fermenting said slurry for a period of less than 8 hours, at a pH in the range of from about 6 to about 7 at a temperature in the range of from about 75° F. to about 90° F., and pasteurizing the fermented slurry to provide a fermented oilseed product having a flavor suitable for use in an imitation dairy product, a smooth texture and enhanced quantities of diacetyl and acetylmethylcarbinol.

2. A method in accordance with claim 1 wherein said inoculum concentration level is in the range of from about $5 \times 10^6$ to about $1 \times 10^8$ cells per milliliter of the slurry.

3. A method in accordance with claim 1 wherein said pasteurized fermented slurry is dried to a solids content greater than about 95% by weight and a moisture content of less than 5% by weight based on the total weight of the dried product to provide a dried oilseed product having a storage stability of at least about 3 months.

4. A method in accordance with claim 1 wherein a fermentation enhancing agent selected from the group consisting of citric acid, acetic acid, edible salts thereof and mixtures thereof is provided in said slurry at a level in the range of from about 0.15% to about 0.60% by weight, based on the total weight of the aqueous slurry, and wherein said inoculum cell density is in the range of from about $5 \times 10^6$ to about $1 \times 10^7$ cells per milliliter.

5. A method in accordance with claim 1 wherein said ground aqueous oilseed slurry is a ground soybean slurry or a soymilk slurry produced by removing fiber from a ground soybean slurry.

6. A method in accordance with claim 1 wherein said ground aqueous oilseed slurry is a ground soybean slurry or a soymilk slurry produced by removing fiber from a ground soybean slurry, and further comprising the step of blending the fermented oilseed product with an edible fat component to provide a homogeneous imitation dairy product mixture comprising from about 3 to about 13 weight percent of the fermented oilseed product, from about 10 to about 40 weight percent of the edible fat component and from about 40 to about 80 weight percent water, based on the total weight of the homogeneous imitation dairy product mixture.

7. An imitation dairy product produced in accordance with the method of claim 6.

8. An imitation dairy product in accordance with claim 7 which is an imitation cream cheese product comprising from about 4 to about 10 weight percent of fermented soybean oilseed product, from about 20 to about 30 weight percent of the edible fat component having a melting point in the range of from about 70° F. to about 100° F. and from about 50 to about 65 weight percent water, said imitation cream cheese product having a pH in the range of from about 4.5 to about 6.0.

* * * * *